United States Patent Office 3,531,710
Patented Sept. 29, 1970

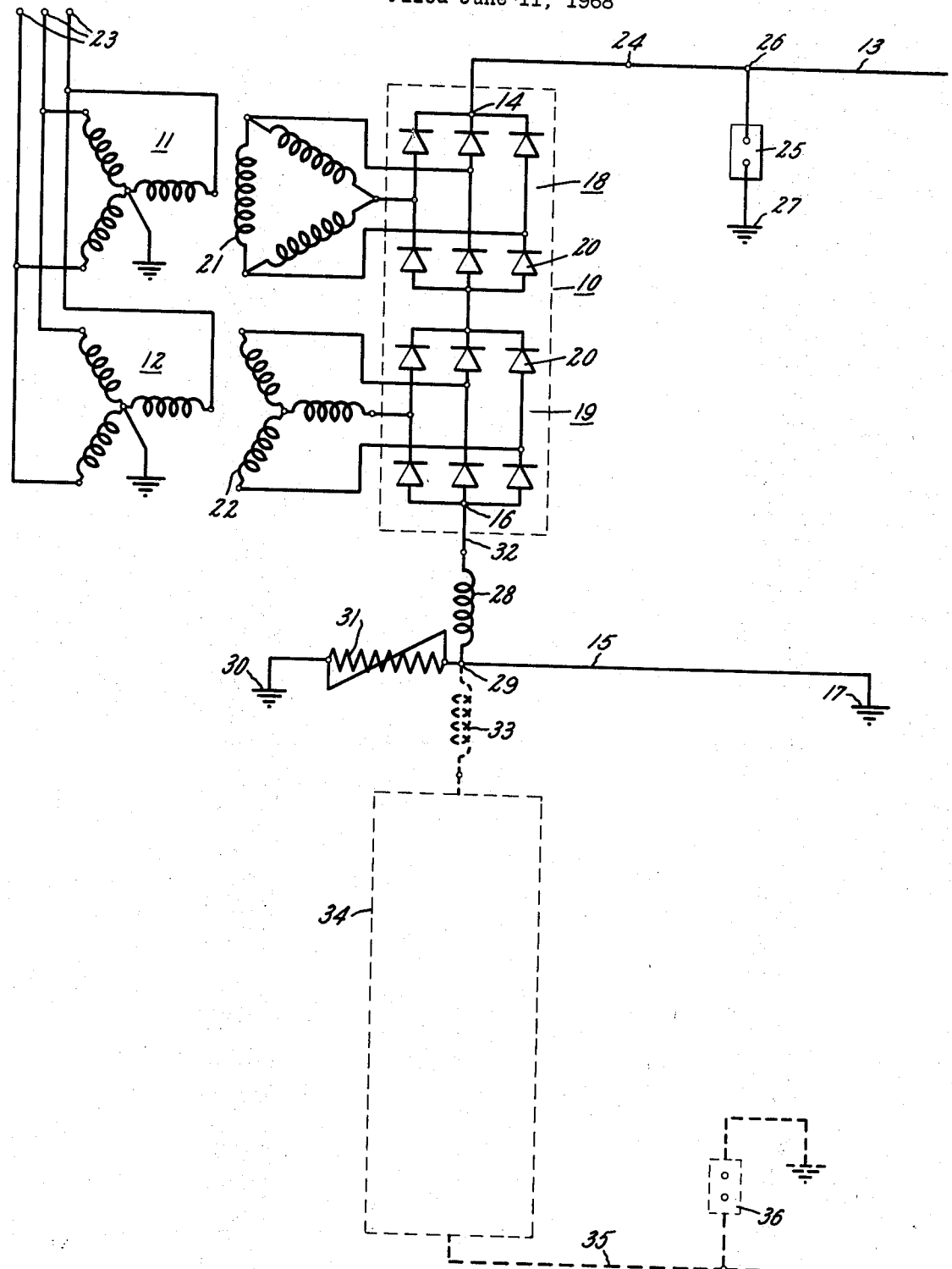

3,531,710
HIGH VOLTAGE DC TRANSMISSION TERMINAL CIRCUIT
Glenn D. Breuer, Schenectady, N.Y., and Colin M. Stairs, Peterborough, Ontario, Canada, assignors to General Electric Company, a corporation of New York
Filed June 11, 1968, Ser. No. 736,090
Int. Cl. H02m 1/18; H02h 1/04
U.S. Cl. 321—14                                    3 Claims

ABSTRACT OF THE DISCLOSURE

The reactor in a converter group is relocated from the line or high voltage end of the terminal to the low voltage or ground end. In so doing it is removed from a position next to a lightning arrester where it is subjected to the high line voltages to a position where the reactor voltage is low permitting a significant reduction in the insulation required for and the cost of the reactor.

---

This invention relates to high voltage DC transmission terminal circuits, and in particular to the location of the DC reactor in the circuit in relation to other components such as the current converters and surge protective devices.

In a high voltage DC power transmission system, it has been the accepted practice to place a lightning arrester at the line end of the terminal of each converter group, and locate a DC reactor between the arrester and the converter group. Because the line end of the terminal is at the high voltage with respect to ground, the reactor must be insulated for this high line voltage. Presumably, the reactor is placed in the line between the high voltage pole of the converter group and the lightning arrester so that along with its normal functions, such as smoothing out the ripple on the direct current, limiting the rate of current rise in the converter during abnormal conditions, etc., it also acts as a choke coil to high frequency surges such as lightning for keeping these high voltages out of the converting equipment and allowing them to discharge to ground through the lightning arrester. In this particular arrangement, the reactor helps protect the converting equipment, but in so doing the insulation in the reactor is exposed to the high line to ground voltage.

Accordingly, the object of this invention is to lower the reactor to ground voltage and thereby realize a significant reduction in the reactor insulation necessary.

According to the invention, the reactor in a converter group is relocated from the line end of the terminal to the other side of the converter groups between the other pole thereof and the ground electrode line. In this new location, all the reactor functions, except the surge protective function, remain unchanged. Lightning arresters suitable for use in high voltage DC transmission lines have now been improved to the point that they are capable of discharging the high voltage surges to ground without the aid of choke coils; therefore, the reactor need no longer be placed next to the arrester where it is subjected to the high line voltages. Since the electrode line to ground voltage is low, the reactor voltage is also low. Consequently, the insulation necessary in the reactor is reduced very significantly, resulting in very substantial savings in the cost of a reactor.

In order that the invention may be more readily understood reference will now be made to the accompanying drawing in which the single figure is a simplified diagram illustrating the nature of the invention.

In the drawing there is shown a converter group 10 for converting alternating current from transformers 11 and 12 into direct current for transmission over a line to an inverter group at the other end which turns the direct current back into alternating current. The DC transmission line illustrated consists of a line conductor 13 which connects pole 14 of converter group 10 to a corresponding pole of a remote inverter group (not shown), and means for connecting the other pole of the converter and inverter to the earth such as the electrode line 15 which connects the other pole 16 of converter group 10 to ground at 17 some distance away from the converter station. Converter group 10 has two full wave current rectifying bridges 18 and 19 connected in series across the transmission line, each of which contains six rectifiers 20, such as solid state semiconductors or mercury arc rectifiers. Bridge 18 is supplied with three phase alternating current from the delta connected secondary 21 of transformer 11 and bridge 19 from the Y connected secondary 22 of transformer 12. The primary windings of the two transformers are Y connected and are supplied with three phase alternating current from power lines 23. Delta and Y connected secondaries such as 21 and 22 produce a 30 degree shift in the phase of the alternating current supplies to bridges 18 and 19, which results in a unidirectional output from converter 10 of pulses at 30 degree intervals. This arrangement of transformers and rectifiers is one of a number well known in the art. As is also well known, a converter such as 10 may have more than two bridges of rectifiers such as 18 and 19 connected in series and each leg of a bridge may contain more than two rectifiers such as 20. The particular arrangment of rectifiers and transformers employed in a converter group will depend on the DC voltage wanted. This voltage will certainly be high in order to realize the benefiits accruing from DC power transmission.

According to the information available to us, all the high voltage DC power transmission systems constructed to date have used DC reactors for the following purposes: to smooth out the ripple on the current output of the converters so that the current transmitted through the long transmission line is essentially all direct current; to limit the rate that the current in the converters can rise during abnormal conditions in the system; to maintain continuous current flow from the converters at light loads; and to protect the converting equipment from high voltage surges such as those caused by lightning striking a transmission line. In these prior installations the reactor was placed in line conductor 13 at point 24 between pole 14 of converter 10 and a lightning arrester 25 with the reactor and the connection 26 of the arrester to the line located very near the converter. The location of the arrester itself will be such that the conductors to it from point 26 and from it to earth at 27 will be as short and direct as possible. In this location 24 in high voltage line 13, the reactor is exposed to the maximum voltages to ground of the transmission line, and it must therefor be insulated accordingly.

We have found that with the advent of improved lightning arresters for use on DC transmission lines, reactors are no longer needed for assisting the lightning arresters in protecting the converting equipment against lightning surges and the like. The new arrester is quite capable of this function without a reactor backing it up, and in some applications the reactor may even detract from the performance of the arrester in its surge protective function. According to the invention we relocate the reactor from its previous location at 24 in the high voltage line conductor to a position on the grounded side of the converter group. In this new location, the reactor is identified by numeral 28 and is shown connected to pole 16 of the converter group by means of a relatively short conductor 32 and directly to terminal 29 of electrode line 15. In addition to being connected to the remote ground 17 via electrode line 15, terminal 29 is also connected to a nearby ground 30 through a varistor 31.

Since the resistance of the varistor decreases with increases in voltage, ground 30 keeps terminal 29 at substantially ground potential even though the voltage on the electrode line rises above its normal low level. With terminal 29 at substantially ground potential, the voltage with respect to ground of all parts of the reactor will be very low indeed. Hence much less insulation will now be required in the reactor. Reactor 28 is a type well known in the art for the purposes mentioned earlier. However, in its new location in the electrode line to ground, it no longer supplements the lightning arrester in protecting the converter group from surges. As already pointed out, arrester 25 is of a type which needs no choke coil. A type of lightning arrester well suited for use at 25 is disclosed in U.S. application No. 624,297, filed Mar. 20, 1967.

The description so far and the circuit shown in solid lines is but one section of a high voltage DC power transmission system. In order to illustrate how this equipment can be multiplied in a system, another power section is shown in dotted lines. This other section is, in effect, an inverted image of the circuit shown in full lines. It consists of a converter group 34 like converter group 10 which has one pole connected to terminal 29 through a reactor 33 like reactor 28 and the other pole connected to a high voltage line conductor 35 protected by a lightning arrester 36 like arrester 25. Converter 34 incorporates two current rectifying bridges like 18 and 19 which are supplied with alternating current from transformers like 11 and 12 fed from line 23. The converting equipment of the power sections located at the other end of the DC transmission line for changing the direct current back to alternating current will differ little from components 10 and 34, will usually include reactors similar to 28 and 33, and surge protection similar to 25 and 36. As is well known, the firing control of the rectifiers in the bridges which convert alternating current to direct current will differ somewhat from firing control of the rectifiers in the bridges which convert direct current to alternating current.

Those skilled in the art will readily appreciate that there are a number of known arrangements of current converters, transformers, transmission lines, etc., in which a DC reactor can be applied according to our invention to economize on reactor insulation. All these arrangements offering such advantages are believed to be within the scope of our invention.

What we claim as new and desire to secure by Letters Patent of the United States is:

1. A high voltage DC power transmission system comprising at least one power section comprising at least one current converter group having AC power connecting means and DC poles of opposite polarity; at least one AC transformer having primary and secondary windings; conductors connecting one of said windings to said connecting means; other conductors connecting the other one of said windings to an AC power line; a DC line conductor connected to one of said poles; a lightning arrester having its ground terminal connected to ground and its line terminal connected to said DC line conductor near said one pole; an electrode line having one end connected to a terminal located near said converter group and the other end connected to ground, said electrode line being relatively long so that said ground is located far from said converter group; and a DC reactor having a winding connected between said last terminal and the other pole of said converter group in series with the electrode line and the converter group, said last terminal being connected to another nearby ground through a varistor.

2. The DC power transmission system of claim 1 wherein said converter group is a converter of alternating current from said one transformer winding into direct current applied to said DC line conductor and said electrode line.

3. The DC power transmission system of claim 1 wherein said converter group is a converter of direct current from said DC line conductor and said electrode line into alternating current applied to said one transformer winding.

References Cited

UNITED STATES PATENTS 2,063,237   12/1936   Fassler _____ 321—14 X

FOREIGN PATENTS 121,177   1959   U.S.S.R.

OTHER REFERENCES

Adamson and Hingorani, "High Voltage Direct Current Power Transmission," Garraway Ltd., London, England, 1960, pp. 107, 108.

J D MILLER, Primary Examiner

W. H. BEHA, JR., Assistant Examiner

U.S. Cl. X.R.

317—61.5